(12) United States Patent
Graham

(10) Patent No.: US 11,000,948 B2
(45) Date of Patent: May 11, 2021

(54) ROBOTIC ARM ASSEMBLY

(71) Applicant: General Electric Company, Schenectady, NY (US)

(72) Inventor: Andrew Crispin Graham, Badminton (GB)

(73) Assignee: General Electric Company, Schenectady, NY (US)

(*) Notice: Subject to any disclaimer, the term of this patent is extended or adjusted under 35 U.S.C. 154(b) by 34 days.

(21) Appl. No.: 15/991,019

(22) Filed: May 29, 2018

(65) Prior Publication Data
US 2019/0366534 A1 Dec. 5, 2019

(51) Int. Cl.
| | | |
|---|---|---|
| *B25J 9/10* | (2006.01) | |
| *B25J 9/06* | (2006.01) | |
| *B25J 19/06* | (2006.01) | |
| *B25J 9/00* | (2006.01) | |

(52) U.S. Cl.
CPC .............. *B25J 9/06* (2013.01); *B25J 9/104* (2013.01); *B25J 19/063* (2013.01); *B25J 19/065* (2013.01); *B25J 9/0021* (2013.01)

(58) Field of Classification Search
CPC ........ F16H 9/065; F16H 9/0021; F16H 9/126; F16H 9/1694; F16H 9/104; F16H 9/1045; F16H 9/1075; F16H 19/0672; F16H 2007/0887; B25J 9/065; B25J 9/0021; B25J 9/126; B25J 9/1694; B25J 9/104; B25J 9/1045; B25J 9/1075; A61B 2034/715
USPC ..................................................... 901/21, 36
See application file for complete search history.

(56) References Cited

U.S. PATENT DOCUMENTS

| | | | |
|---|---|---|---|
| 4,620,362 A | | 11/1986 | Reynolds |
| 4,671,732 A | * | 6/1987 | Gorman .................. B25J 9/046 414/735 |
| 4,913,617 A | | 4/1990 | Nicholson |
| 5,085,619 A | * | 2/1992 | Torii ....................... B25J 9/103 474/138 |
| 5,682,795 A | * | 11/1997 | Solomon ............... B25J 9/1045 403/387 |
| 5,816,770 A | * | 10/1998 | Itagaki .................... B25J 9/042 414/744.5 |
| 6,048,307 A | | 4/2000 | Grundl et al. |

(Continued)

FOREIGN PATENT DOCUMENTS

| | | | | |
|---|---|---|---|---|
| CN | 107253182 | | 10/2017 | |
| EP | 426859 A1 | * | 5/1991 | .............. B25J 17/00 |

(Continued)

OTHER PUBLICATIONS

Partial European Search Report Corresponding to Application No. 19175339 dated Oct. 28, 2019.

*Primary Examiner* — Bobby Rushing, Jr.
(74) *Attorney, Agent, or Firm* — Dority & Manning, P.A,

(57) ABSTRACT

A robotic arm assembly includes a robotic arm including a link, a control rope operable with the link, and an attachment section, the control rope extending at least partially through the attachment section. The robotic arm assembly also includes an actuator pack attached to, or positioned adjacent to, the attachment section of the robotic arm, the actuator pack including an actuator, the actuator operable with the control rope and including a motor defining a pivot axis, the motor configured to move about the pivot axis to displace the control rope.

18 Claims, 7 Drawing Sheets

(56) References Cited

U.S. PATENT DOCUMENTS

| | | | |
|---|---|---|---|
| 6,668,678 B1* | 12/2003 | Baba | B25J 9/104 |
| | | | 414/680 |
| 7,270,589 B1 | 9/2007 | Brown, Jr. et al. | |
| 8,118,805 B2* | 2/2012 | Jinno | B25J 9/104 |
| | | | 606/1 |
| 8,245,593 B2 | 8/2012 | Graham et al. | |
| 8,910,984 B2* | 12/2014 | Akae | B25J 15/0009 |
| | | | 294/106 |
| 8,992,113 B2 | 3/2015 | Campagna et al. | |
| 9,259,274 B2* | 2/2016 | Prisco | B25J 9/1045 |
| 9,273,758 B2* | 3/2016 | Orita | F16H 7/1281 |
| 9,312,739 B2 | 4/2016 | Pettey | |
| 9,469,027 B2* | 10/2016 | Ekas | B25J 15/0009 |
| 9,713,874 B2 | 7/2017 | Lee et al. | |
| 9,821,471 B2 | 11/2017 | Laville et al. | |
| 9,850,994 B2* | 12/2017 | Schena | B25J 9/1045 |
| 9,931,106 B2* | 4/2018 | Au | A61B 17/00 |
| 2003/0159535 A1* | 8/2003 | Grover | B25J 18/04 |
| | | | 74/490.04 |
| 2010/0331820 A1* | 12/2010 | Prisco | A61B 34/30 |
| | | | 604/528 |
| 2012/0215358 A1 | 8/2012 | Gettings et al. | |
| 2014/0140800 A1* | 5/2014 | Inoue | B25J 9/042 |
| | | | 414/744.5 |
| 2016/0184986 A1 | 6/2016 | Procyshyn et al. | |
| 2016/0345801 A1* | 12/2016 | Kishi | A61B 34/71 |
| 2017/0105805 A1* | 4/2017 | Hasegawa | B25J 9/1045 |
| 2017/0209227 A1* | 7/2017 | Yoshimura | B25J 9/1045 |
| 2017/0284971 A1 | 10/2017 | Hall | |
| 2017/0299025 A1 | 10/2017 | Pettey | |
| 2018/0056510 A1* | 3/2018 | Doggett | B25J 9/1045 |
| 2018/0125595 A1* | 5/2018 | Yoshii | B25J 17/02 |

FOREIGN PATENT DOCUMENTS

| | | |
|---|---|---|
| JP | S6471687 | 3/1989 |
| WO | WO2015/169886 | 11/2015 |

* cited by examiner

ROBOTIC ARM ASSEMBLY

FIELD

The present subject matter relates generally to an attachment assembly of a robotic arm, an actuator pack of the robotic arm assembly, and a robotic arm assembly including a robotic arm and an actuator pack.

BACKGROUND

Robotic arm assemblies are useful throughout various industries for performing operations at, e.g., remote locations, hazardous locations, etc. At least certain robotic arm assemblies include a robotic arm formed of a plurality of links joined together at respective joints. Additionally, a plurality of control wires may extend through the robotic arm, with each wire terminating at an individual link for moving such link relative to an aft-adjacent link. The control wires may be coupled to one or more motors within a base of the robotic arm assembly, such that the robotic arm assembly may control a movement of the robotic arm by increasing and/or decreasing tension on the plurality of control wires.

Specifically, robotic arm assemblies typically include linear motors for coupling to each of the control wires of the robotic arm to increase or decrease a tension on the control wires. For example, the control wire may include a crimp at one end, and the linear motor may include an arm which may be coupled to the crimp. The arm may then be extended by the linear motor, or retracted by the linear motor, to increase or decrease the tension on the control wire.

However, with such a configuration, the arm of each linear motor must be manually coupled to each control wire (or rather, to the crimp of each control wire), and further one or more tools are typically required for making such connection. Accordingly, a robotic arm assembly capable of connecting a robotic arm to a base without requiring a plurality of tools to make such connection would be useful. Further, a robotic arm assembly capable of connecting a robotic arm to a base while minimizing the amount of connections that must be made would also be useful.

BRIEF DESCRIPTION

Aspects and advantages of the invention will be set forth in part in the following description, or may be obvious from the description, or may be learned through practice of the invention.

In one exemplary aspect of the present disclosure, a robotic arm assembly is provided. The robotic arm assembly includes a robotic arm including a link, a control rope operable with the link, and an attachment section, the control rope extending at least partially through the attachment section; and an actuator pack attached to, or positioned adjacent to, the attachment section of the robotic arm, the actuator pack including an actuator, the actuator operable with the control rope and including a motor defining a pivot axis, the motor configured to move about the pivot axis to displace the control rope.

In certain exemplary embodiments the actuator further includes an actuator arm operable with the control rope, wherein the motor is configured to rotate the actuator arm about the pivot axis such that the actuator arm displaces the control rope.

For example, in certain exemplary embodiments the actuator arm of the actuator includes an extension and an interface member, wherein the extension extends between a first end and a second end, wherein the first end of the extension is coupled to the motor and the second end of the extension is coupled to the interface member, wherein the interface member is configured to contact the control rope.

For example, in certain exemplary embodiments the actuator arm of the actuator is configured to move the control rope from a baseline position to a displaced position, wherein the control rope extends in a substantially linear direction when in the baseline position, and wherein the actuator arm of the actuator is configured to move at least a section of the control rope in a direction perpendicular to the substantially linear direction when moving the control rope to the displaced position.

For example, in certain exemplary embodiments the robotic arm further includes a first stationary roller and a second stationary roller each operable with the control rope, and wherein the actuator arm is operable to displace the control rope at a location between the first stationary roller and the second stationary roller.

In certain exemplary embodiments the robotic arm further includes a tension release, wherein the control rope is attached to the tension release.

For example, in certain exemplary embodiments the tension release includes a trigger operable to reduce a tension on the control rope when the tension on the control rope exceeds a predetermined threshold.

For example, in certain exemplary embodiments the trigger is configured as a magnetic connection, a mechanical fuse, or both.

For example, in certain exemplary embodiments the tension release includes a roller and a biasing member and defines a tension release axis, wherein the control rope is attached to the roller, and wherein the biasing member biases the roller in a first circumferential direction about the tension release axis.

For example, in certain exemplary embodiments the displacement of the control rope by the actuator moves the roller in a second circumferential direction about the tension release axis, and wherein the second circumferential direction is opposite the first circumferential direction.

For example, in certain exemplary embodiments the roller of the tension release includes a feature, wherein the tension release further includes a trigger configured to engage the feature of the roller when the roller is moved in the second circumferential direction, and wherein the feature of the roller is configured to overcome the trigger when a tension on the control rope the above a predetermined threshold.

In certain exemplary embodiments the link of the robotic arm is a first link of a plurality of links, wherein the control rope of the robotic arm is a first control rope of a plurality of control ropes of the robotic arm, wherein each of the plurality of control ropes extends at least partially through the attachment section of the robotic arm and is operable with at least one of the plurality of links of the robotic arm, wherein the actuator of the actuator pack is a first actuator of a plurality of actuators, and wherein each actuator of the plurality of actuators includes a motor configured to move about its respective pivot axis to displace one of the plurality of control ropes.

In another exemplary aspect of the present disclosure, a robotic arm for a robotic arm assembly is provided. The robotic arm includes a plurality of links sequentially arranged; a plurality of control ropes operable with the plurality of links, the plurality of control ropes including a first control rope; and an attachment section including a tension release, the first control rope extending at least partially through the attachment section and coupled to the tension release, the tension release including a trigger operable to reduce a tension on the first control rope when the tension on the first control rope exceeds a predetermined threshold.

In certain exemplary embodiments the tension release includes a roller and a biasing member and defines a tension release axis, wherein the control rope is attached to the roller, and wherein the biasing member biases the roller in a first circumferential direction about the tension release axis.

For example, in certain exemplary embodiments a displacement of the control rope moves the roller in a second circumferential direction about the tension release axis, wherein the second circumferential direction is opposite the first circumferential direction, wherein the roller of the tension release includes a feature, and wherein the tension release further includes a trigger configured to engage the feature of the roller when the roller is moved in the second circumferential direction.

For example, in certain exemplary embodiments the feature of the roller is configured to overcome the trigger when a tension on the control rope is above a predetermined threshold.

In certain exemplary embodiments the trigger is configured as a magnetic connection, a mechanical fuse, or both.

In another exemplary aspect of the present disclosure, an actuator pack for a robotic arm assembly is provided. The robotic arm assembly further including a robotic arm having a plurality of links sequentially arranged, a plurality of control ropes operable with the plurality of links, and an attachment section with the plurality of control ropes extending therethrough. The actuator pack including an attachment section including a plurality of actuators, the plurality of actuators including a first actuator operable with the control rope when the attachment section of the actuator pack is coupled to, or positioned adjacent to, the attachment section of the robotic arm assembly, the first actuator having a motor defining a pivot axis and being operable to move about its pivot axis to displace one of the plurality of control ropes.

In certain exemplary embodiments the first actuator includes an actuator arm moveable by the motor about the pivot axis of the motor, wherein the actuator arm of the first actuator includes an extension and an interface member, wherein the extension extends between a first end and a second end, wherein the first end of the extension is coupled to the motor and the second end of the extension is coupled to the interface member, wherein the interface member is configured to contact the control rope.

In certain exemplary embodiments the motor is a rotary motor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
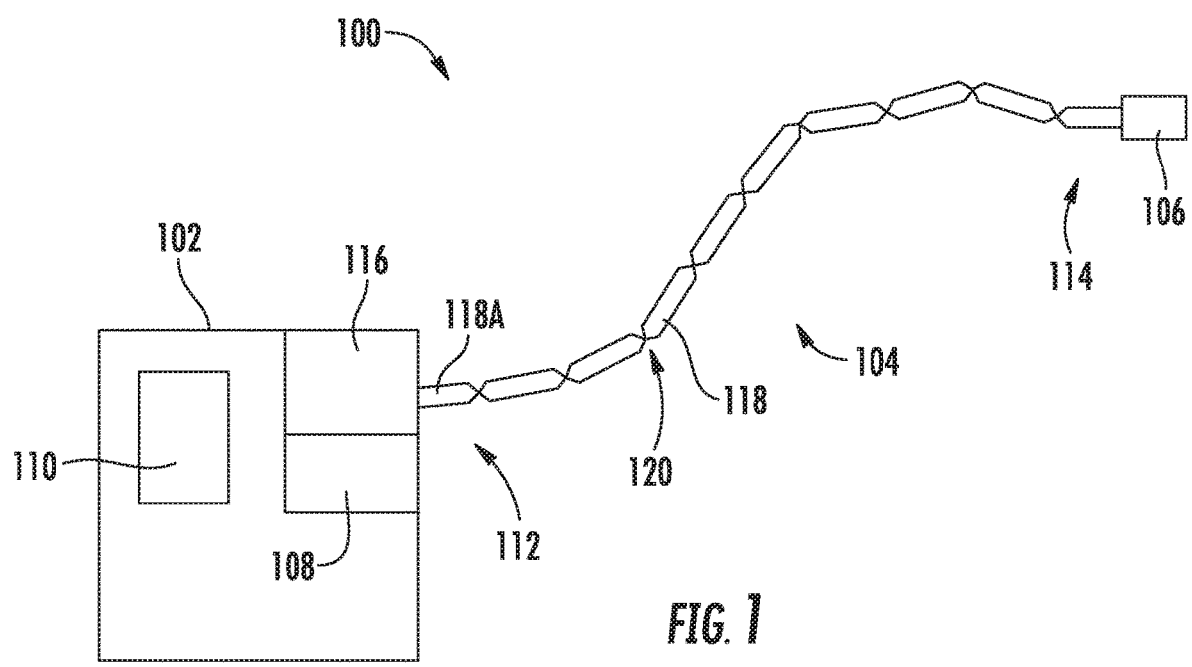
FIG. 1 is a schematic, cross-sectional view of a robotic arm assembly in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a component or system, and refer to the normal operational attitude of the component or system. For example, with regard to a robotic arm, forward refers to a position closer to a distal end of the robotic arm and aft refers to a position closer to a root end of the robotic arm.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the Figs., FIG. 1 is a schematic view of a robotic arm assembly 100 in accordance with an exemplary embodiment of the present disclosure. The exemplary robotic arm assembly 100 depicted generally includes a base 102, a robotic arm 104, and a utility member 106. The base 102 generally includes an actuator pack 108 and a controller 110. The controller 110 is operably coupled to the actuator pack 108 for controlling operation of the robotic arm assembly 100. Additionally, the controller 110 may be operably coupled to the utility member 106 and/or one or more sensors (not shown) attached to or embedded in the robotic arm 104 and/or utility member 106. Further, the robotic arm 104 extends generally between a root end 112 and a distal end 114. As will be explained in greater detail below, the robotic arm 104 includes an attachment section 116 at the root end 112, with the attachment section 116, for the embodiment depicted, attached to the actuator pack 108 of the base 102. Additionally, the robotic arm 104 includes the utility member 106 at the distal end 114.

Moreover, the robotic arm 104 of the exemplary robotic arm assembly 100 depicted is generally formed of a plurality of links 118 and a plurality of joints 120, with the plurality of links 118 sequentially arranged and movably coupled to one another with the plurality of joints 120. A first link 118A of the plurality of links 118 is coupled to the attachment section 116 of the robotic arm 104 for the embodiment depicted.

Figure 2:
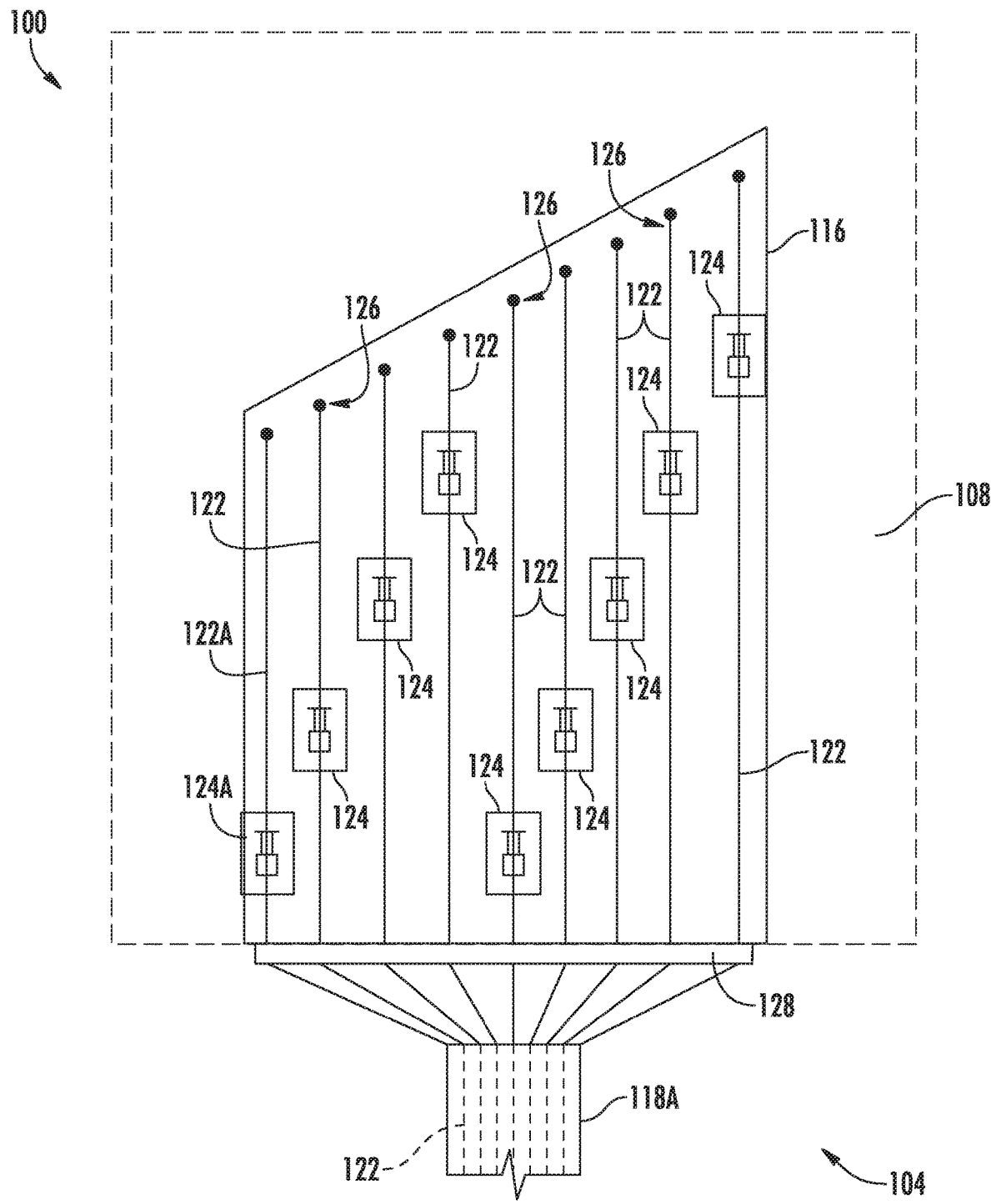
FIG. 2 is a close-up, schematic view of an attachment section of a robotic arm and actuator pack in accordance with an exemplary embodiment of the present disclosure.

Referring now also to FIG. 2, a close-up, schematic view is provided of the attachment section 116 of the robotic arm 104 positioned over the actuator pack 108 of the base 102 of the exemplary robotic arm assembly 100 of FIG. 1. It will be appreciated that the robotic arm 104 generally includes a control rope 122 operable with at least one link 118 of the plurality of links 118 of the robotic arm 104, with the control rope 122 extending at least partially through the attachment section 116. Further, the actuator pack 108 of the base 102 is attached to, or positioned adjacent to, the attachment section 116 of the robotic arm 104, with the actuator pack 108 including an actuator 124. More specifically, for the embodiment depicted, the control rope 122 is a first control rope 122A of a plurality of control ropes 122 of the robotic arm 104 and the actuator 124 is a first actuator 124A of a plurality of actuators 124 of the actuator pack 108. More specifically, still, for the embodiment depicted, the actuator pack 108 includes a dedicated actuator 124 for each of the plurality of control ropes 122 of the robotic arm 104 (i.e., nine actuators 124 for the nine control ropes 122 depicted).

It will be appreciated, that as used herein, the term "operable" with respect to a control rope 122 and a link 118 refers to the control rope 122 being capable of controlling some aspect of the link's 118 movement. For example, the control rope 122 may be coupled to the link 118 such that it may move the link 118 relative to an aft-adjacent link 118 by increasing or decreasing its tension. Further, it will be appreciated that as used herein, the term "positioned adjacent to" with reference to the actuator pack 108 and the attachment section 116 refers to the actuator pack 108 and attachment section 116 being close enough such that one or more actuators 124 of the actuator pack 108 may physically contact, or otherwise physically interact with, the control rope(s) 122 extending through the attachment section 116.

Referring still to the embodiment depicted, the control ropes 122 each include a first end 126 fixedly coupled within the attachment section 116, with each control rope 122 extending through a bracket of the attachment section 116 to the first link 118A of the plurality of links 118 of the robotic arm 104. From there, each of the control ropes 122 extends through one or more links 118 of the plurality of links 118 (as is indicated by the control ropes 122 being depicted in phantom extending through the first link 118A). The actuators 124 may increase or decrease a tension on each of the control ropes 122, as will be explained in greater detail below, to control operation of the plurality of links 118 of the robotic arm 104.

It will be appreciated, however, that although nine individual control ropes 122 and actuators 124 are provided for the embodiment depicted, in other exemplary embodiments, any other suitable number of control ropes 122 and actuators 124 may be included. For example, in other embodiments, the robotic arm 104 may include between two (2) and two thousand (2,000) control ropes 122 (or more) and the actuator pack 108 may similarly include between two (2) and two thousand (2,000) actuators 124 (or more). Additionally, although the plurality of actuators 124 within the actuator pack 108 is arranged in a staggered manner, in other embodiments, the plurality of actuators may be arranged in any other suitable manner.

Figure 3:
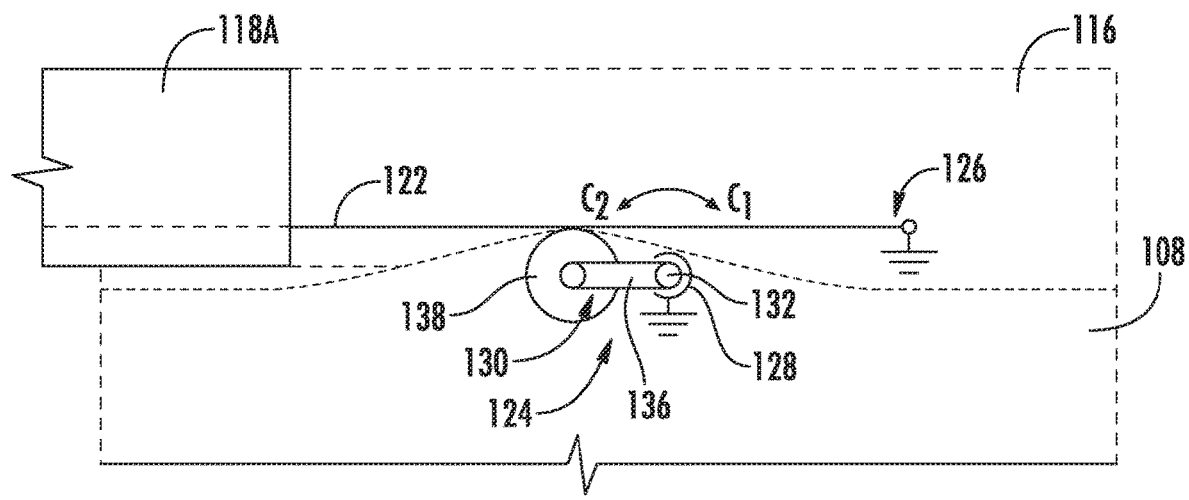
FIG. 3 is a schematic view of an actuator of an actuator pack and an attachment section of a robotic arm in accordance with an exemplary embodiment of the present disclosure.
Figure 4:
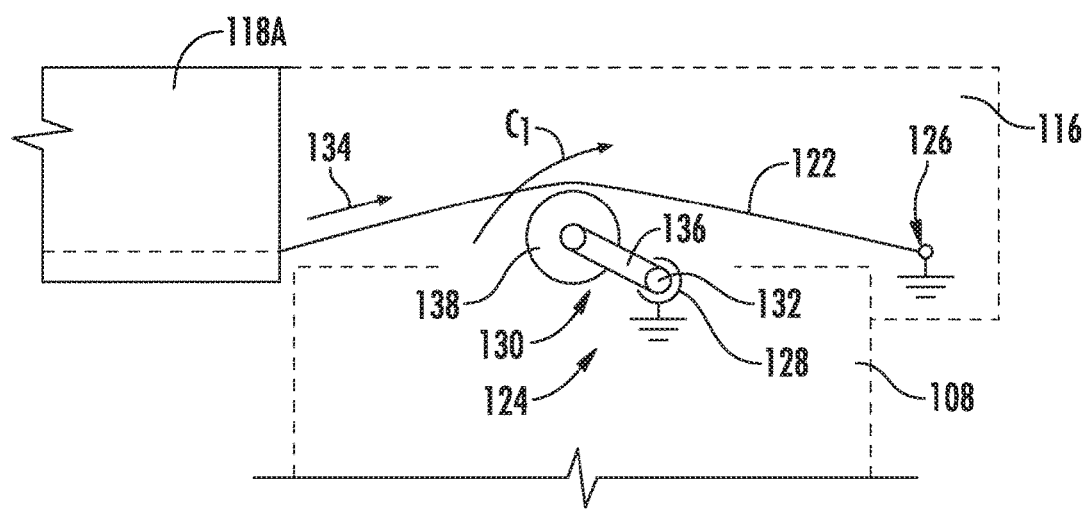
FIG. 4 is another schematic view of the exemplary actuator of the actuator pack and attachment section of the robotic arm of FIG. 3.

Referring particularly to FIGS. 3 and 4, a side, schematic view of a control rope 122 of a robotic arm 104 and an actuator 124 of an actuator pack 108 in accordance with an exemplary embodiment of the present disclosure is depicted. The exemplary robotic arm 104 and actuator pack 108 depicted in FIGS. 3 and 4 may be configured in substantially the same manner as the exemplary robotic arm 104 and actuator pack 108 described above with reference to FIGS. 1 and 2. Thus, the control rope 122 may be one of the plurality of control ropes 122 depicted, and the actuator 124 may be one of the plurality of actuators 124 depicted. However, in other embodiments, the robotic arm 104 and actuator 124 of FIGS. 3 and 4 may be configured in any other suitable manner.

In such a manner, it will be appreciated that the robotic arm 104 further includes a link 118, such as a first link 118A, and an attachment section 116, with the control rope 122 extending at least partially therethrough. Further, for the embodiment of FIGS. 3 and 4, the exemplary actuator 124 includes a motor 128 and actuator arm 130, the motor 128 defining a pivot axis 132. The actuator arm 130 is operable with the control rope 122 of the robotic arm 104, and more specifically, the motor 128 is configured to move the actuator arm 130 about the pivot axis 132 of the motor 128 to displace the control rope 122 of the robotic arm 104. Briefly, it will be appreciated that the actuator pack 108 is attached to, or positioned adjacent to, the attachment section 116 of the robotic arm 104. More specifically, for the embodiment depicted, the actuator pack 108 is attached to the attachment section 116 of the robotic arm 104.

Referring still to the embodiment of FIGS. 3 and 4, as noted, the motor 128 of the actuator 124 is configured to move the actuator arm 130 to displace the control rope 122 of the robotic arm by rotating the control arm 130 in a first circumferential direction C1 relative to the pivot axis 132 of the motor 128. This movement of the actuator arm 130 in the first circumferential direction C1 is depicted in FIG. 4. Notably, the motor 128 may further be configured to maintain the control arm 130 at a particular circumferential position relative to the pivot axis 132 and/or to move the control arm 130 in a second circumferential direction C2 (opposite the first circumferential direction C1) to reduce a displacement of the control rope 122 (i.e., from the position depicted in FIG. 4 back to the position depicted in FIG. 3, or any position therebetween). In such a manner, it will be appreciated that for the embodiment depicted, the motor 128 is configured as a rotary motor. However, in other embodiments, any other suitable motor or motor assembly may be utilized to pivot the actuator arm 130 in the manner described herein.

More particularly, for the embodiment depicted, the actuator arm 130 of the actuator 124 is configured to move the control rope 122 from a baseline position, as is depicted in FIG. 3, to a displaced position, as is depicted in FIG. 4. When in the baseline position, the control rope 122 extends in a substantially linear direction through the attachment section 116. The actuator arm 130 is configured to move at least a section of the control rope 122 at least partially in a direction perpendicular to the substantially linear direction when moving the control rope 122 to the displaced position. In such a manner, it will be appreciated that moving the control rope 122 from the baseline position (FIG. 3) to the displaced position (FIG. 4) by rotating the actuator arm 130 with the motor 128 in the first circumferential direction C1 may effectively pull on the control rope 122 relative to the first link 118, as is indicated by the arrow 134 in FIG. 4. Such may therefore increase a tension of the control rope 122 to control one or more of the plurality of links 118 of the robotic arm 104 in a desired manner.

It will be appreciated, of course, that the baseline position depicted in FIG. 4 is one exemplary "displaced" position for the actuator arm 130 and for the control rope 122 depicted. In other exemplary embodiments, the actuator 124 may be operable to displace the control rope 122 to any other suitable number of "displaced" positions to provide relatively precise control options for the particular link 118 of the plurality of links 118 controlled by the exemplary control rope 122 depicted.

For the particular embodiment depicted, it also will be appreciated that the actuator arm 130 of the actuator 124 generally includes an extension 136 and an interface member to perform such functionality. As is depicted, the exemplary extension 136 extends between a first end and a second end (not labeled). The first end of the extension 136 is coupled to the motor 128 and the second end of the extension 136 is coupled to the interface member. For the embodiment shown, the interface member is configured as an actuator roller 138, with the extension 136 rotatably coupled thereto. The actuator roller 138 is, in turn, operable with the control rope 122. When the motor 128 moves the actuator arm 130 about the pivot axis 132, the roller 138 may rotate about the second end of the extension 136 to reduce an amount of friction that may otherwise be generated between the actuator arm 130 and the control rope 122. Although not depicted, the roller 138 may include a groove or other indentation for receiving the control rope 122.

It will be appreciated, however, that the exemplary actuator 124 depicted is provided by way of example only. In other exemplary embodiments, any other suitable actuator 124 may be utilized. For example, in other embodiments, the actuator arm 130 may have any other suitable configuration for interfacing with the control rope 122. For example, in other embodiments, the interface member may not be configured as an actuator roller 138, and instead may be configured as, e.g., a relatively smooth bar or curved surface attached to, or integrated into, the extension 136 of the actuator arm 130.

Moreover, in other exemplary embodiments, any other suitable robotic arm 104, and particularly, attachment section 116 of a robotic arm 104 may be provided. For example, referring now to FIGS. 5 and 6, a side, schematic view of a control rope 122 of a robotic arm 104 and an actuator 124 of an actuator pack 108 in accordance with another exemplary embodiment of the present disclosure is depicted. The exemplary robotic arm 104 and actuator pack 108 depicted in FIGS. 5 and 6 may be configured in substantially the same manner as the exemplary robotic arm 104 and actuator pack 108 described above with reference to FIGS. 3 and 4. In such a manner, it will be appreciated that the robotic arm 104 additionally includes a link 118, such as a first link 118A, and an attachment section 116, with the control rope 122 extending at least partially therethrough. Further, for the embodiment depicted the actuator pack 108 includes a motor 128 and an actuator arm 130, with the motor 128 defining a pivot axis 132. The actuator arm 130 is operable with the control rope 122 of the robotic arm 104, and more specifically, the motor 128 is configured to move the actuator arm 130 about the pivot axis 132 (e.g., in a first circumferential direction C1 about the pivot axis 132) of the motor 128 to displace the control rope 122 of the robotic arm 104.

However, for the embodiment depicted, the attachment section 116 of the robotic arm 104 of the robotic arm assembly 100 further includes structure, or rather stationary features, to increase a displacement of the control rope 122 for a given angular movement of the actuator arm 130. More specifically, for the embodiment depicted, the robotic arm 104 further includes a stationary roller operable with the control rope 122, with the actuator arm 130 of the actuator pack 108 configured to move the control rope 122 relative to the stationary roller. More specifically, for the embodiment depicted, the stationary roller is a first stationary roller 140 and the robotic arm 104 further includes a second stationary roller 142. For the embodiment depicted, the actuator arm 130 is configured to displace the control rope 122 at a location between the first stationary roller 140 and the second stationary roller 142. More specifically, for the embodiment depicted, the roller 138 of the actuator arm 130 is configured to extend about the pivot axis 132 of the motor 128, through the first stationary roller 140 and the second stationary roller 142, as indicated by the arrow indicating the first circumferential direction C1. Such may create an increased amount of movement of the control rope 122 for a given angular motion of the actuator arm 130 of the actuator 124 about the pivot axis 132 of the motor 128.

Notably, for the embodiment depicted, each of the first stationary roller 140 and second stationary roller 142 are configured to rotate about their respective local axes 144, 146, respectively. In such a manner, it will be appreciated that the first stationary roller 140 and second stationary roller 142 are rotatably mounted within the attachment section 116 of the robotic arm 104. However, in other exemplary embodiments, one or both of the first stationary roller 140 and second stationary roller 142 may be fixedly mounted within the attachment section 116 of the robotic arm 104. With such an exemplary embodiment, first stationary roller 140 or second stationary roller 142 may define a reduced radius, such that less surface area is contacting the control rope 122, to reduce a friction drag on the control rope 122 during operation.

Moreover, it will be that in still other exemplary embodiments, any other suitable stationary features may be provided for increasing a movement of the control rope 122 for a given angular movement of the actuator arm 130. For example, in other embodiments, the attachment section 116 of the robotic arm 104 may only include one of the first stationary roller 140 or second stationary roller 142. Additionally, or alternatively, other suitable control rope interfaces may be included within the attachment section 116 of the robotic arm 104 in place of one or both of the first stationary roller 140 or second stationary roller 142 to provide a similar functionality. The control rope interfaces may have any other suitable shape or configuration for performing the functions described above. For example, in other embodiments, one or both of these control rope interfaces may be configured as a relatively smooth surface preventing a displacement of the control rope 122 relative to the actuator arm 130 of the actuator 124, as a relatively smooth bar, etc.

Further, it will be appreciated that for the embodiment depicted, the first end 126 of the control rope 122 is fixedly attached within the attachment section 116 the robotic arm 104. However, in other embodiments, the control rope 122 may be mounted in a manner to allow for, e.g., an emergency release of tension on the control rope 122 in the event that the robotic arm 104 of the robotic arm assembly 100 is overloaded.

Figure 6:
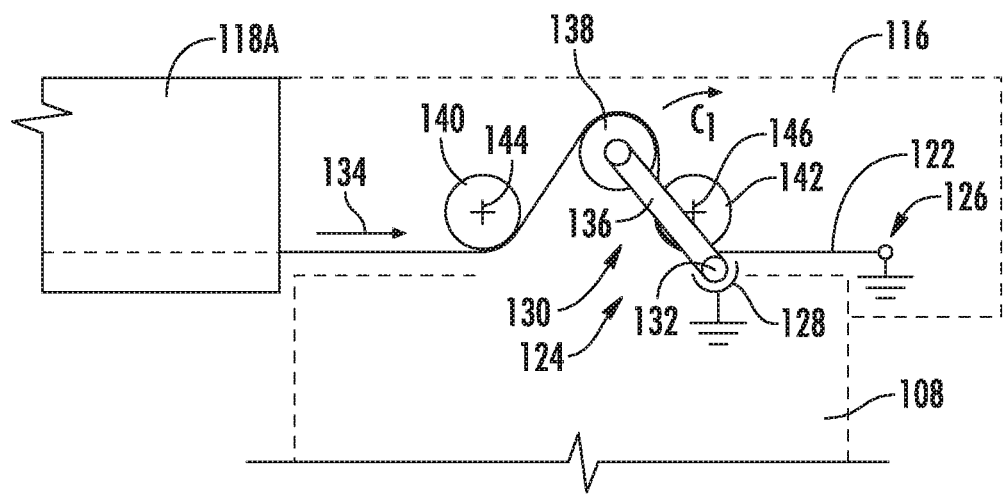
FIG. 6 is another schematic view of the exemplary actuator of the actuator pack and attachment section of the robotic arm of FIG. 5.
Figure 7:
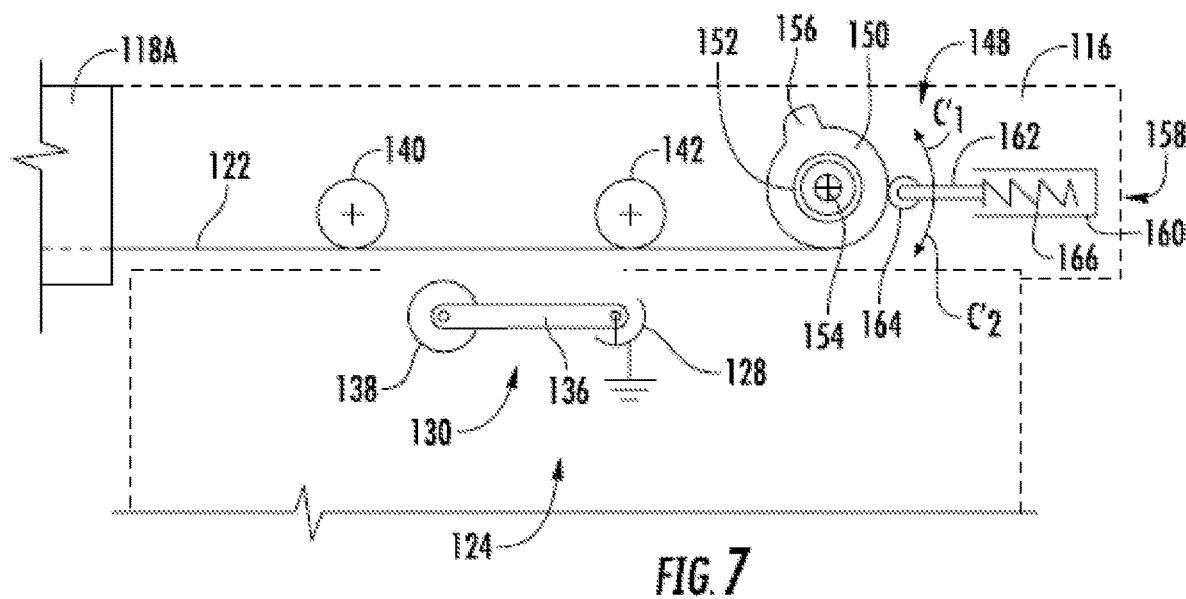
FIG. 7 is a schematic view of an actuator of an actuator pack and an attachment section of a robotic arm in accordance with yet another exemplary embodiment of the present disclosure.
Figure 8:
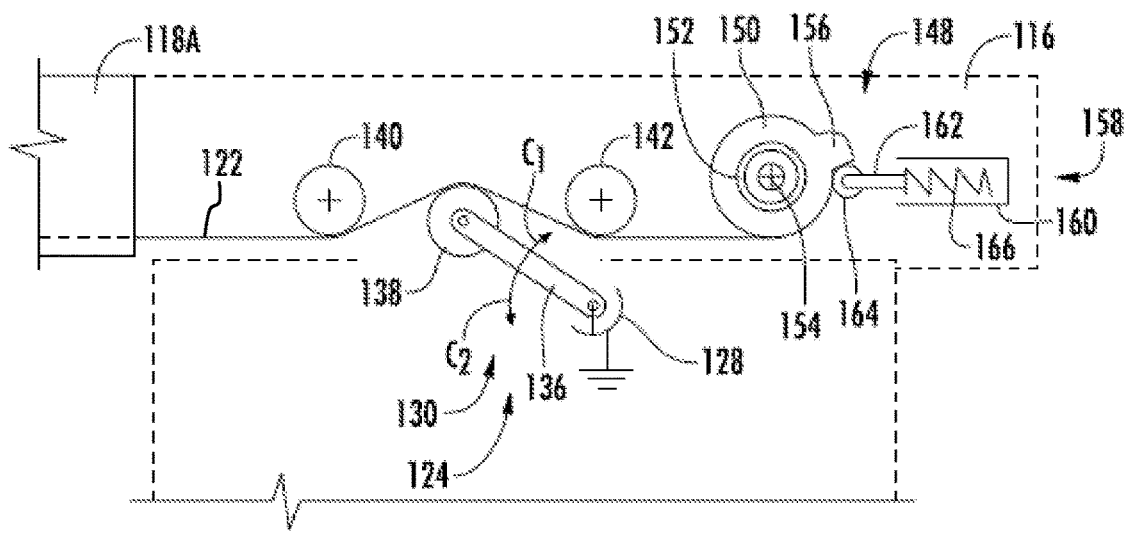
FIG. 8 is another schematic view of the exemplary actuator of the actuator pack and attachment section of the robotic arm of FIG. 7.

For example, referring now to FIGS. 7 and 8, a side, schematic view of a control rope 122 of a robotic arm 104 and an actuator 124 of an actuator pack 108 in accordance with another exemplary embodiment of the present disclosure is depicted. The exemplary robotic arm 104 and actuator pack 108 depicted in FIGS. 7 and 8 may be configured in substantially the same manner as the exemplary robotic arm 104 and actuator pack 108 described above with reference to FIGS. 5 and 6. In such a manner, it will be appreciated that the robotic arm 104 further includes a link 118, such as a first link 118A, and an attachment section 116, with the control rope 122 extending at least partially therethrough. Further, the actuator pack 108 includes an actuator 124 having a motor 128 and actuator arm 130, the motor 128 defining a pivot axis 132. The actuator arm 130 is operable with the control rope 122 of the robotic arm 104, and more specifically, the motor 128 is configured to move the actuator arm 130 about the pivot axis 132 of the motor 128 to displace the control rope 122 of the robotic arm 104.

However, for the embodiment of FIGS. 7 and 8, the robotic arm 104 further includes a tension release 148 positioned within the attachment section 116 of the robotic arm 104, with the control rope 122 being attached to the tension release 148. Notably, for the embodiment depicted, the actuator 124 of the actuator pack 108 is operable with the control rope 122 at a location between the first link 118A of the robotic arm 104 and the tension release 148 of the robotic arm 104. For example, in at least certain exemplary embodiments, a first end 126 (not labeled) of the control rope 122 may be attached to the tension release 148. However, in other exemplary embodiments, the tension release 148 may instead be positioned between the first link 118A and the location where the actuator 124 is operable with the control rope 122.

For the embodiment depicted, the tension release 148 generally includes a main roller 150 and a biasing member 152, and further generally defines a tension release axis 154. The biasing member 152 biases the main roller 150 in a first circumferential direction C'1 about the tension release axis 154, which for the embodiment depicted in FIGS. 7 and 8 is a counterclockwise direction. Notably, FIG. 7 depicts the control rope 122 of the robotic arm 104 being positioned in a baseline position. The biasing member 152 may maintain the control rope 122 in the baseline position when the actuator arm 130 of the actuator 124 is not displacing the control rope 122 and/or in the absence of the actuator 124. Additionally, FIG. 8 depicts the control rope 122 in a starting position. In the starting position, the actuator 124 of the actuator pack 108 has displaced the control rope 122 a minimal amount, overcoming the biasing force of the biasing member 152 of the tension release 148, without substantially moving the control rope 122 relative to the plurality of links 118. More particularly, it will be appreciated that the displacement of the control rope 122 by the actuator arm 130 of the actuator 124 when the control rope is moved to the starting position moves the main roller 150 in a second circumferential direction C'2 about the tension release axis 154, with the second circumferential direction C'2 being opposite the first circumferential direction C'1, and more particularly being a clockwise direction for the exemplary view and embodiment depicted.

Figure 5:
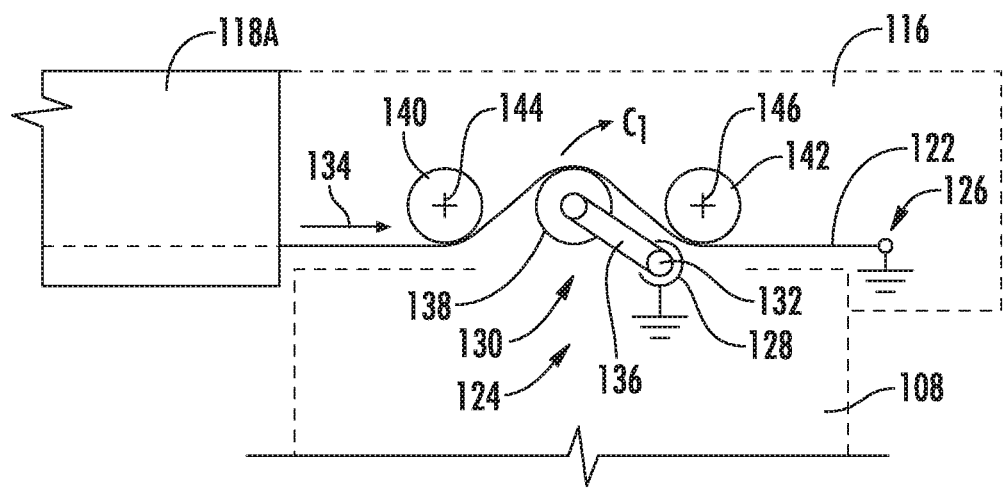
FIG. 5 is a schematic view of an actuator of an actuator pack and an attachment section of a robotic arm in accordance with another exemplary embodiment of the present disclosure.

As is also depicted, for the embodiment shown, the main roller 150 of the tension release 148 includes a feature 156 and the tension release 148 further includes a trigger 158 configured to engage the feature 156 of the main roller 150 when the main roller 150 is moved in the first circumferential direction C'1, and more specifically, when the control rope 122 is moved from the baseline position to the starting position (and past the starting position to an engaged position; see, e.g., FIGS. 4, 5, 6). In such a manner, it will be appreciated that the trigger 158 is operable to reduce a tension on the control rope 122 when the tension on the control rope 122 exceeds a predetermined threshold.

More specifically, for the embodiment shown, the trigger 158 includes a trigger base 160, a shaft 162, and a trigger roller 164. The trigger roller 164 is rotatably coupled to a distal end of the shaft 162, and the base 160 includes a trigger biasing member 166 configured to press the shaft 162 and trigger roller 164 into the main roller 150 of the tension release 148. For the embodiment depicted, the trigger biasing member 166 is configured as a spring. However in other embodiments, the trigger biasing member 166 may additionally, or alternatively, be any suitable hydraulic, pneumatic, or other pressure source for creating a desired biasing force for the trigger 158.

Moreover, for the embodiment shown, the feature 156 of the main roller 150 of the tension release 148 is a protrusion on the main roller 150, and the trigger 158 creates a friction with the protrusion to prevent, or frustrate, rotation of the main roller 150 of the tension release 148 in the second circumferential direction C'2 of the main roller 150, and more specifically, of the protrusion past the trigger 158. However, in the event the link 118 of the robotic arm 104 being controlled by the control rope 122 is exposed to a force in excess of its designed capability (or some other predetermined value), a tension on the control rope 122 may exceed a predetermined threshold. With the depicted configuration, the feature 156 of the main roller 150 is configured to overcome the biasing force of the trigger 158 when the tension on the control rope 122 is above this predetermined threshold. In certain embodiments, the force may be due to contacting a stationary object in an environment through which the robotic arm 104 is extending, a failure of a component within the environment within which the robotic arm 104 is extending, etc.

Figure 9:
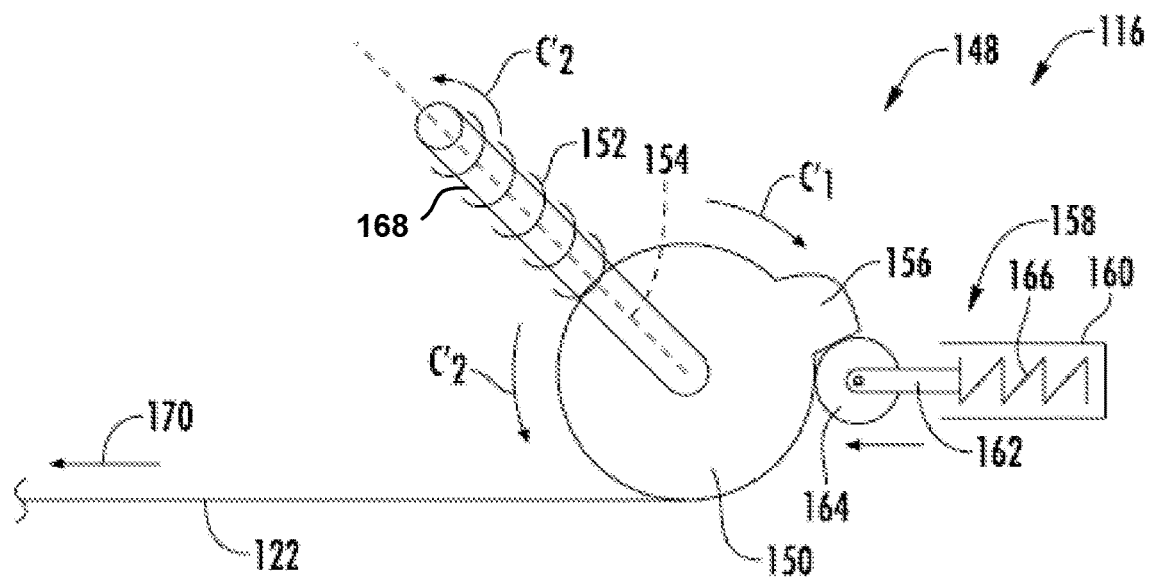
FIG. 9 is close-up, perspective, schematic view of a tension release of an attachment section of a robotic arm in accordance with an embodiment of the present disclosure.
Figure 10:
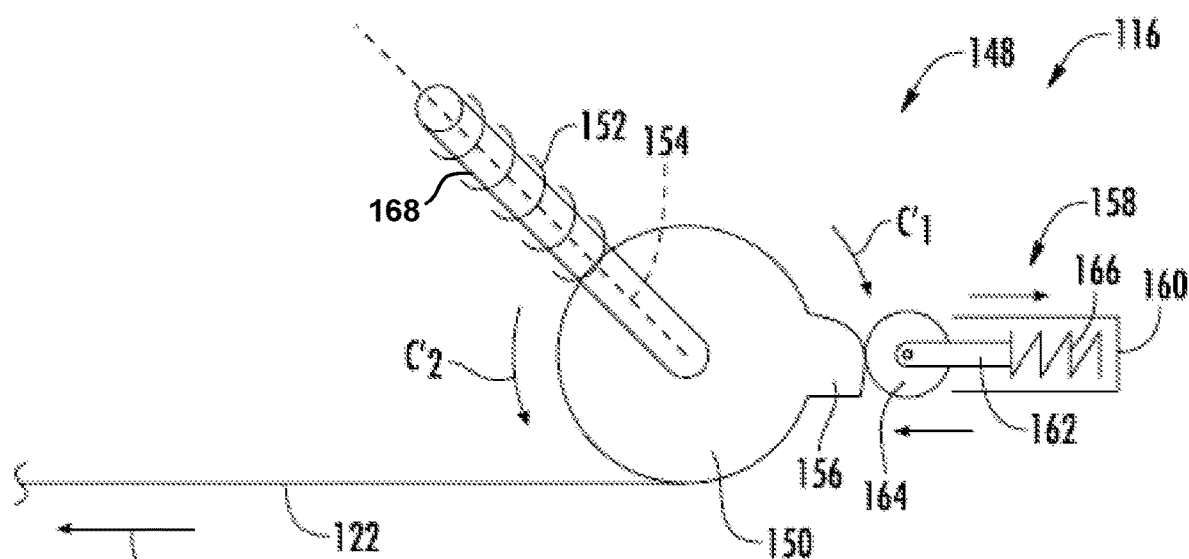
FIG. 10 is another close-up, perspective, schematic view of the exemplary tension release of FIG. 9.

Referring now to FIGS. 9 and 10 the function of the tension release 148 will be described in greater detail. FIGS. 9 and 10 depict a perspective view of a tension release 148 in accordance with the present disclosure. More specifically, the exemplary tension release 148 of FIGS. 9 and 10 is configured in substantially the same manner as exemplary tension release 148 described above with reference to FIGS. 7 and 8.

As is depicted, the tension release 148, in addition to the main roller 150, includes a shaft 168. The shaft 168 is fitted with the biasing member 152, which for the embodiment depicted is a spring. However, in other embodiments, any other suitable biasing member 152 may be utilized. For example, in other embodiments, the biasing member 152 may be any one of a suitable pneumatic, hydraulic, or other biasing member 152. The biasing member 152 is configured to apply a biasing circumferential force on the shaft 168, as well as the main roller 150, in the second circumferential direction C'2. Tension on the control rope 122 due to, e.g., the actuator arm 130 of the actuator 124 and/or a load on one or more of the plurality of links 118 of the robotic arm 104, creates a tension force on the control rope 122, which in turn applies a working circumferential force on the main roller 150 of the tension release 148 in the first circumferential direction C'1. The working circumferential force opposes the biasing circumferential force. Additionally, the feature 156 on the main roller 150, which for the embodiment shown is a protrusion, provides additional resistance in the first circumferential direction C'1 for the main roller 150 of the tension release 148. However, when the tension on the control rope 122 (indicated by arrow 170) exceeds a predetermined threshold—the predetermined threshold determined based on a resistance provided by the trigger 158 and the feature 156 of the main roller 150, as well as the biasing force from the biasing member 152—the feature 156 on the main roller 150 of the tension release 148 moves past the trigger 158. The movement of the feature 156 of the main roller 150 past the trigger 158 allows for the main roller 150 to rotate in the first circumferential direction C'1, which may provide additional slack to the control rope 122, reducing a tension on the control rope 122.

Figure 11:
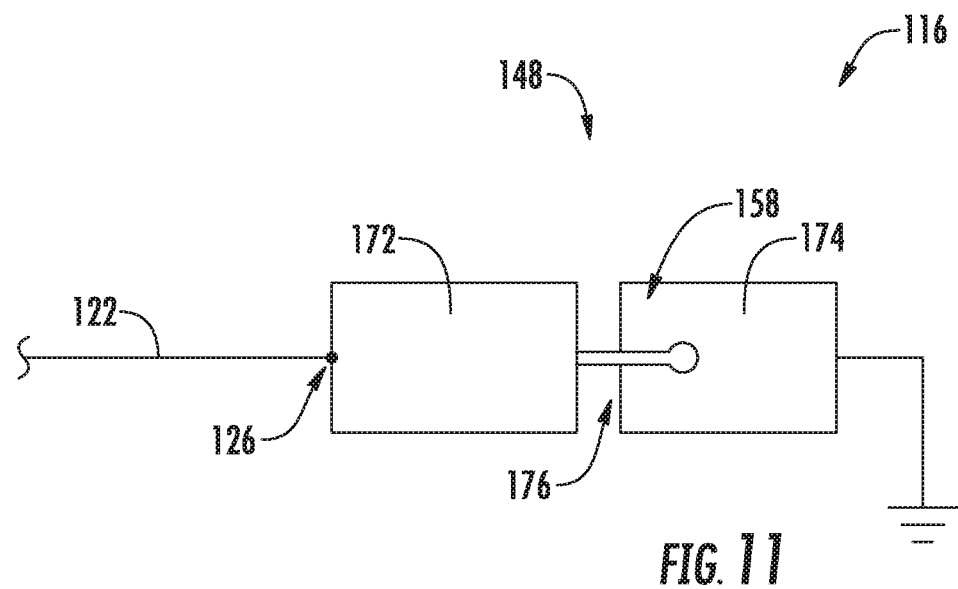
FIG. 11 is a schematic view of a tension release of an attachment section of a robotic arm in accordance with another exemplary embodiment of the present disclosure.

It will be appreciated, however, that in other exemplary embodiments, the tension release 148 may have any other suitable configuration. For example, in other exemplary embodiments, the biasing member 152 of the tension release 148 may act as the trigger 158, such that the tension on the control rope 122 need only exceed a biasing force applied by the biasing member 152 to increase an amount of slack provided to the control rope 122, which may therefore decrease an amount of tension on the control rope 122. Additionally, referring briefly to FIGS. 11 and 12, each providing additional exemplary embodiments of a tension release 148 in accordance with the present disclosure, in other embodiments, a trigger 158 of the tension release 148 may generally be configured as a connection configured to break at a predetermined tension threshold. Specifically, referring to FIG. 11, the tension release 148 includes a first member 172 coupled to a first end 126 of the control rope 122 and a second member 174 fixed in position within the attachment section 116 of the robotic arm 104. The first member 172 and second member 174 together form the trigger 158 of the tension release 148. More specifically, for the embodiment depicted, the trigger 158 is configured as a mechanical fuse 176, and the first member 172 is coupled to the second member 174 through the mechanical fuse 176. The mechanical fuse 176 is configured to fail when a tension on the control rope 122 exceeds a predetermined threshold.

Figure 12:
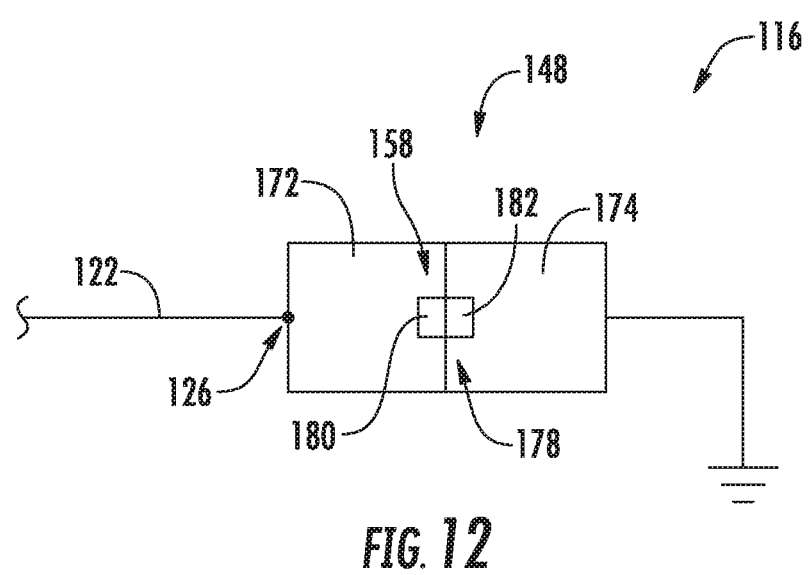
FIG. 12 is a schematic view of a tension release of an attachment section of a robotic arm in accordance with yet another exemplary embodiment of the present disclosure.

Similarly, referring to FIG. 12, the tension release 148 again includes a first member 172 coupled to the control rope 122 and a second member 174 fixed in position within the attachment section 116 of the robotic arm 104 and the first member 172 and second member 174 together form a trigger 158. However, for the embodiment of FIG. 12, the trigger 158 formed by the first member 172 and the second member 174 of the tension release 148 is configured as a magnetic attachment 178. More specifically, the first member 172 is coupled to the second member 174 through the magnetic attachment 178. For example, the first member 172 includes a first magnetic or ferromagnetic material 180 and the second member 174 similarly includes a second magnetic or ferromagnetic material 182. The first magnetic or ferromagnetic material 180 is configured to interact with the second magnetic or ferromagnetic material 182. Specifically, for the embodiment depicted, the first material 180 of the first member 172 includes a first magnet and the second material 182 of the second member 174 includes a ferromagnetic material. When a tension on the control rope 122 exceeds a predetermined threshold, the magnetic force between the first and second materials 180, 182 is overcome, slack is given to the control rope 122, and a tension of the control rope 122 is reduced.

It will be appreciated, however, that in other exemplary embodiments, any other suitable trigger 158 and/or tension release 148 may be utilized. Additionally, the inclusion of a tension release in accordance with one or more embodiments of the present disclosure may reduce the risk of a control rope or other component of a robotic arm assembly being damaged as a result of an overloading force.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A robotic arm assembly comprising:
   a robotic arm comprising a link, a control rope operable with the link, and an attachment section, the control rope extending at least partially through the attachment section; and
   an actuator pack attached to, or positioned adjacent to, the attachment section of the robotic arm,
   wherein the actuator pack includes an actuator,
   wherein the actuator is operable with the control rope,
   wherein the actuator includes a motor,
   wherein the control rope has a baseline position in which the control rope extends in a straight line between two stationary points or first and second stationary rollers, wherein the motor is configured to move an extension to displace the control rope from the baseline position between the two stationary points or the first and second stationary rollers, wherein the actuator further includes an actuator arm having the extension that is operable with the control rope, and wherein the motor is configured to rotate the actuator arm about a pivot axis such that the actuator arm displaces the control rope.

2. The robotic arm assembly of claim 1,
wherein the actuator arm of the actuator includes an interface member,
wherein the extension extends between a first end and a second end,
wherein the first end of the extension is coupled to the motor and the second end of the extension is coupled to the interface member,
wherein the interface member is configured to contact the control rope.

3. The robotic arm assembly of claim 1,
wherein the actuator arm of the actuator is configured to move the control rope from the baseline position to a displaced position,
wherein the control rope extends in a substantially linear direction when in the baseline position, and
wherein the actuator arm of the actuator is configured to move at least a section of the control rope in a direction perpendicular to the substantially linear direction when moving the control rope to the displaced position.

4. The robotic arm assembly of claim 1,
wherein the robotic arm further comprises a tension release,
wherein the control rope is attached to the tension release.

5. The robotic arm assembly of claim 4, wherein the tension release includes a trigger operable to reduce a tension on the control rope when the tension on the control rope exceeds a predetermined threshold.

6. The robotic arm assembly of claim 5, wherein the trigger is configured as a magnetic connection, a mechanical fuse, or both.

7. The robotic arm assembly of claim 4,
wherein the tension release includes a roller and a biasing member and defines a tension release axis,
wherein the control rope is attached to the roller, and
wherein the biasing member biases the roller in a first circumferential direction about the tension release axis.

8. The robotic arm assembly of claim 7,
wherein the displacement of the control rope by the actuator moves the roller in a second circumferential direction about the tension release axis, and
wherein the second circumferential direction is opposite the first circumferential direction.

9. The robotic arm assembly of claim 8,
wherein the roller of the tension release includes a feature,
wherein the tension release further comprises a trigger configured to engage the feature of the roller when the roller is moved in the second circumferential direction, and
wherein the feature of the roller is configured to overcome the trigger when a tension on the control rope the above a predetermined threshold.

10. The robotic arm assembly of claim 1,
wherein the link of the robotic arm is a first link of a plurality of links, wherein the control rope of the robotic arm is a first control rope of a plurality of control ropes of the robotic arm,
wherein each of the plurality of control ropes extends at least partially through the attachment section of the robotic arm and is operable with at least one of the plurality of links of the robotic arm,
wherein the actuator of the actuator pack is a first actuator of a plurality of actuators, and
wherein each actuator of the plurality of actuators includes a motor configured to move an extension to displace one of the plurality of control ropes.

11. A robotic arm for a robotic arm assembly comprising:
a plurality of links sequentially arranged;
a plurality of control ropes operable with the plurality of links, the plurality of control ropes including a first control rope; and
an attachment section including a tension release,
wherein the first control rope extends at least partially through the attachment section and is coupled to the tension release,
wherein the tension release includes a trigger operable to reduce a tension on the first control rope when the tension on the first control rope exceeds a predetermined threshold.

12. The robotic arm of claim 11,
wherein the tension release includes a roller and a biasing member and defines a tension release axis,
wherein the control rope is attached to the roller, and
wherein the biasing member biases the roller in a first circumferential direction about the tension release axis.

13. The robotic arm of claim 12,
wherein a displacement of the control rope moves the roller in a second circumferential direction about the tension release axis,
wherein the second circumferential direction is opposite the first circumferential direction,
wherein the roller of the tension release includes a feature, and
wherein the tension release further comprises a trigger configured to engage the feature of the roller when the roller is moved in the second circumferential direction.

14. The robotic arm of claim 13, wherein the feature of the roller is configured to overcome the trigger when a tension on the control rope is above a predetermined threshold.

15. The robotic arm of claim 11, wherein the trigger is configured as a magnetic connection, a mechanical fuse, or both.

16. An actuator pack for a robotic arm assembly, the robotic arm assembly comprising a robotic arm having a plurality of links sequentially arranged, a plurality of control ropes operable with the plurality of links, and an attachment section with the plurality of control ropes extending therethrough, the actuator pack comprising:
a plurality of actuators,
wherein the plurality of actuators includes a first actuator operable with one of the control ropes when the actuator pack is coupled to, or positioned adjacent to, the attachment section of the robotic arm assembly,
wherein the first actuator includes a motor,
wherein the one of the control ropes has a baseline position in which the one of the control ropes extends in a straight line between two stationary points or first and second stationary rollers,
wherein the motor is configured to move an extension to displace the one of the plurality of control ropes from the baseline position between the two stationary points or the first and second stationary rollers, wherein the robotic arm further comprises a tension release, wherein the one of the control ropes is attached to the tension release, and wherein the tension release includes a trigger operable to reduce a tension on the one of the control ropes when the tension on the control rope exceeds a predetermined threshold.

17. The actuator pack of claim 16, wherein the first actuator includes an actuator arm moveable by the motor about a pivot axis of the motor, wherein the actuator arm of the first actuator includes the extension and an interface member, wherein the extension extends between a first end and a second end, wherein the first end of the extension is coupled to the motor and the second end of the extension is coupled to the interface member, wherein the interface member is configured to contact the one of the control ropes.

18. The actuator pack of claim 16, wherein the motor is a rotary motor.

* * * * *